Dec. 15, 1925.

K. D. UMRATH 1,565,341

APPARATUS FOR SHELLING CRUSTACEA

Filed April 4, 1924

Inventor:
KARL D. UMRATH.
Attorney.

Patented Dec. 15, 1925.

1,565,341

UNITED STATES PATENT OFFICE.

KARL D. UMRATH, OF ST. LOUIS, MISSOURI.

APPARATUS FOR SHELLING CRUSTACEA.

Application filed April 4, 1924. Serial No. 704,132.

*To all whom it may concern:*

Be it known that I, KARL D. UMRATH, a citizen of the United States, and residing at St. Louis, State of Missouri, have invented the new and useful Improvement in Apparatus for Shelling Crustacea, of which the following is a specification.

This invention relates to an apparatus for shelling Crustacea.

One of the objects of this invention is to provide a machine by means of which the meat may be separated from the shells of Crustacea in a simple, rapid and convenient manner.

Another object is to provide such a machine which shall be convenient and simple to operate, and which shall be free of complicated devices so as to be easily cleaned or repaired.

Figure 1:
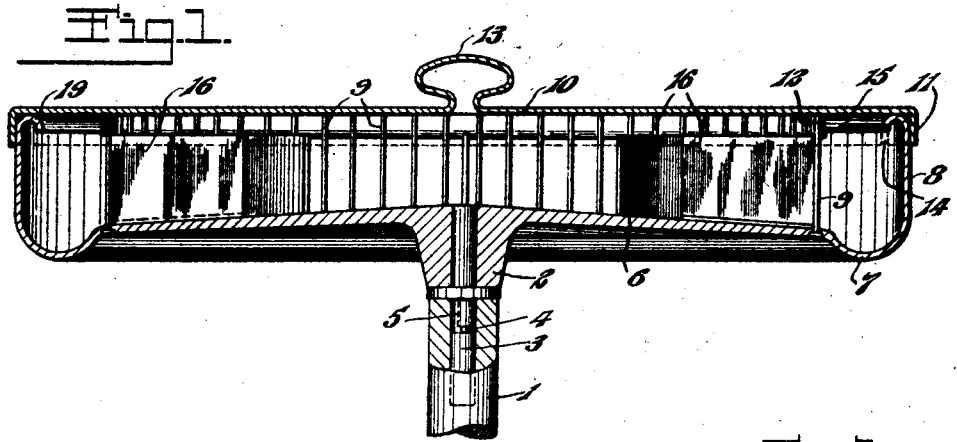
Figure 2:
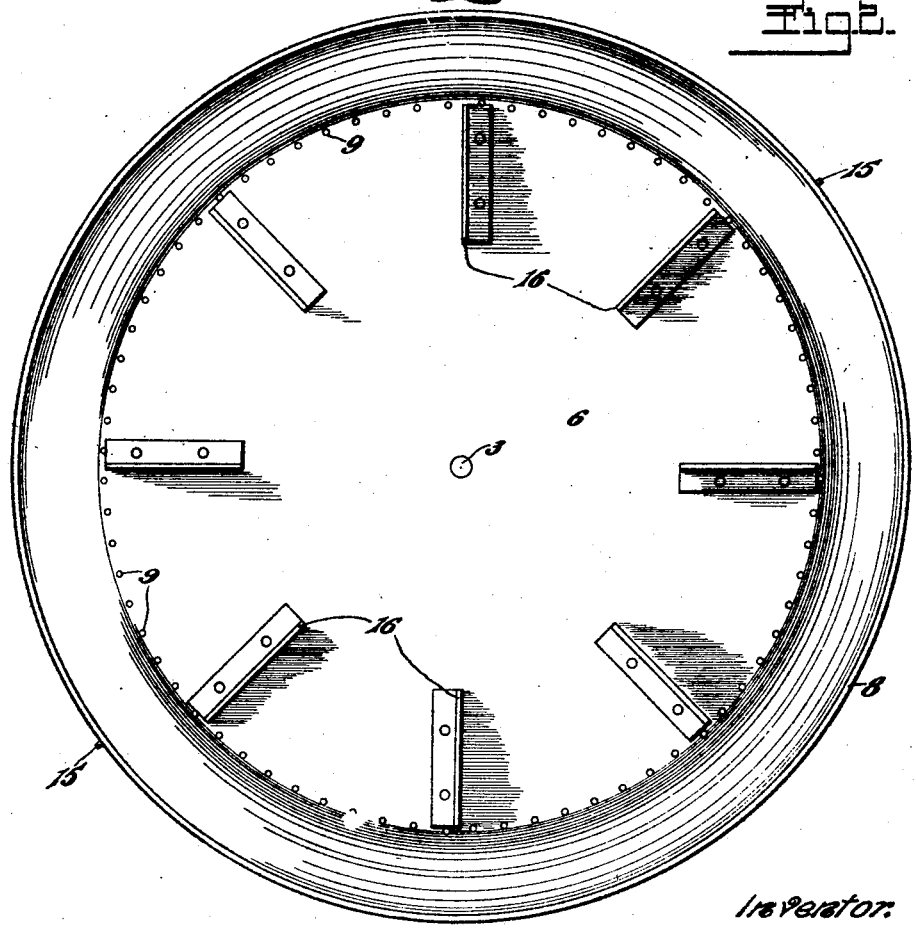

Further objects will appear from the detail description taken in connection with the accompanying drawing, in which:

Figure 1 represents a view in elevation, partly in section, of a device embodying this invention; and Figure 2 is a plan view of the same with the lid removed.

Referring to the accompanying drawing the apparatus comprises, in general, a pan adapted for rotation at a high rate of speed with a shaft 1, which in turn may be driven by any suitable motor, gearing or driving device, (not shown). In practice a series of shafts 1 may be arranged along a table and each shaft may receive a pan or pans as hereinafter described. The hub 2 of the pan has a shank 3 adapted to enter a socket in the shaft and the shank has a pin 4 adapted to enter a bayonet slot or groove 5 in the shaft to form a detachable driving coupling.

The pan is constructed with an outwardly and downwardly sloping bottom 6 surrounded by a depressed peripheral trough or gutter 7. Outside of this gutter an upstanding flange 8 forms the outer rim of the pan; this flange turns over as shown at 19. Mounted in the pan within the inner edge of the gutter 7 is a ring of vertical pins 9, and they are spaced from one another at such distances as to prevent the shells of the Crustacea from passing therebetween but to allow the meat to pass. These pins are mounted so as to form a complete annular grating around the pan just inside of the gutter 7, and dividing the pan into inner and outer compartments. A lid 10 is provided to cover the pan during rotation, and it may be provided with a peripheral flange 11 adapted to take over the flange 8 and also with an inner flange 12 adapted to take over the ends of the pins 9 so as to support the same during revolution. The lid may be provided with a handle or knob 13 while the flange 12 has slots 14 cooperating with pins 15 on the pan flange 8 to form bayonet joints so as to securely retain the lid in place.

In using this device the Crustacea, after being boiled, are cut in half so as to open the meat containing lobes and are then assembled in the pan and within the grating 9, the sections being placed with the open sides outwardly so that the meat will be thrown from the shells by the centrifugal force of rotation. A series of partitions 16 may, if desired, be provided in pans of large capacity, so as to separate the Crustacea and insure that they promptly take up the rotation of the pan. When the pan has been thus loaded, (which may be done when it is off of the shaft 1, and in which case it is placed on the shaft) the loaded pan, with the cover thereon is rotated until the speed reaches about 7500 feet per minute. This will cause the meat to be thrown out of the shells by centrifugal force and, passing between the pins 9 of the grating will collect in the outer compartment of the pan and along the flange 8, the juices collecting in the gutter 7. Thus the pins 9 provide a perforate partition or grating separating the shell compartment from the meat compartment. Through this grating the meat may pass without being unnecessarily shreded or divided and collects in the outer compartment. The pan is now arrested and it may then be removed.

It will be seen that this invention provides a device by means of which the meat may be separated from the shells of Crustacea in a simple and rapid manner. The construction is such that the machine may be quickly loaded and unloaded, and successive operations may follow with great rapidity. The pan may be readily coupled to or from the shaft and when in position is held against disengagement by the bayonet joint. Such a joint also secures the lid or cover on the pan, while the inner flange 12 prevents the pressure of the shells on the pin grating from bending these pins over. The juices thrown outwardly are collected in the gutter and cannot creep over the top of the flange 8 due to the presence of the turned over part 19; accordingly a tight fit of the lid is not necessary. When the cover is taken off the meat may be spooned out of the outer compartment since it is continuous and not interrupted by partitions. Furthermore the construction is simple so that the device may be easily cleaned and kept in a sanitary condition. The pan is in fact a single unit of simple but rigid construction. The inclined bottom causes the shells to slide outwardly against the grating so as to be quickly positioned, while the juices can readily drain to the gutter even when the pan is stationary. In view of the fact that the grating is fixed to the body of the pan, this grating rotates in unison with this pan. Accordingly the meat thrown through the grating is projected against a wall which moves circumferentially at the same speed as the grating and the meat so that the meat will be maintained whole and will not become disintegrated.

It is obvious that various changes may be made in details of construction without departing from the spirit of this invention; it is, therefore, to be understood that this invention is not to be limited to the specific details shown and described.

Having thus described the invention, what is claimed is:

1. An apparatus for shelling Crustacea comprising, a pan adapted and mounted for rotation at high speed, said pan having a perforate circumferential partition or grating dividing the same into inner and outer compartments adapted to respectively receive the shells and the meat thrown therefrom, while said grating is adapted to retain the shells, the outer wall of said pan and said grating being fixed to the body of said pan in order to rotate in unison.

2. An apparatus for shelling Crustacea comprising, a pan mounted for rotation at high speed, the body of said pan having an outer wall fixed thereto, and an upstanding grating fixed to the pan body and inside of said outer wall, adapted to provide an inner compartment for the shells and an outer compartment for the meat thrown therefrom while said grating retains the shells.

3. An apparatus for shelling Crustacea comprising, a pan mounted for rotation at high speed and having an upstanding grating arranged inside of the periphery of the pan, adapted to provide an inner compartment for the shells and an outer continuous compartment for the meat thrown therefrom while said grating retains the shells.

4. An apparatus for shelling Crustacea comprising, a pan mounted for rotation at high speed, the body of said pan having an outer wall fixed thereto, and an upstanding grating fixed to the pan body and inside of said outer wall, adapted to provide an inner compartment for the shells and an outer continuous compartment for the meat thrown therefrom while said grating retains the shells.

5. An apparatus for shelling Crustacea comprising, a pan mounted for rotation at high speed and having an upstanding grating arranged inside of the periphery of the pan, there being a gutter formed outside of said grating, adapted to provide an inner compartment for the shells and an outer continuous compartment for the meat thrown therefrom while said grating retains the shells.

6. An apparatus for shelling Crustacea comprising, a pan mounted for rotation at high speed, the body of said pan having an outer wall fixed thereto, and an upstanding grating fixed to the pan body and inside of said outer wall, the pan body being formed to provide a gutter between said grating and said wall.

7. An apparatus for shelling Crustacea comprising, a pan mounted for rotation at high speed and having an upstanding grating arranged inside of the periphery of the pan, adapted to provide an inner compartment for the shells and an outer compartment for the meat thrown therefrom while said grating retains the shells, and a cover for said pan having means for a supporting the upper part of said grating.

8. An apparatus for shelling Crustacea comprising, a circular pan mounted for rotation at high speed and formed to provide a circumferential gutter, a series of upright pins mounted in said pan and inwardly of said gutter and arranged to provide a perforate partition adapted to retain the shells of the Crustacea, said compartment forming a meat receiving compartment outside thereof, and means for supporting said pins during rotation.

9. An apparatus for shelling Crustacea comprising, a circular pan mounted for rotation at high speed and formed to provide a circumferential gutter, a series of upright pins mounted in said pan and inwardly of said gutter and arranged to provide a perforate partition adapted to retain the shells of the Crustacea, said partition forming a meat receiving compartment outside thereof, and a cover for said pan adapted to support said pins during rotation.

10. An apparatus for shelling Crustacea comprising, a pan mounted for rotation at high speed and having an upstanding grating fixed therein adapted to provide an inner compartment for the shells and an outer compartment for the meat and an outer wall adapted to retain the meat and juices thrown through said grating.

11. An apparatus for shelling Crustacea comprising, a pan mounted for rotation at high speed and having an upstanding grating therein adapted to provide an inner compartment for the shells and an outer compartment for the meat and an outer wall having its edge turned over and adapted to retain the meat and juices thrown through said grating.

12. An apparatus for shelling Crustacea comprising, a pan mounted for rotation at high speed, the body of said pan having an outer wall fixed thereto, and an upstanding grating fixed to the pan body and inside of said outer wall, the pan body being formed to provide a gutter between said grating and said wall and the bottom of said pan inclining to said gutter, adapted to provide an inner compartment for the shells and an outer compartment for the meat thrown therefrom while said grating retains the shells.

13. An apparatus for shelling Crustacea comprising, a driving element rotating at high speed, and a pan having an outside detachable connection with said shaft, said pan having an upstanding grating therein adapted to provide an inner compartment for the shells and an outer compartment for the meat thrown therefrom.

In testimony whereof I affix my signature this 28th day of March, 1924.

KARL D. UMRATH.